(12) United States Patent
Finschi et al.

(10) Patent No.: US 9,016,440 B2
(45) Date of Patent: Apr. 28, 2015

(54) ELEVATOR SYSTEM OPERATION UTILIZING ENERGY CONSUMPTION INFORMATION

(75) Inventors: Lukas Finschi, Ebikon (CH); Karl Weinberger, Immensee (CH)

(73) Assignee: Inventio AG, Hergiswil NW (CH)

( * ) Notice: Subject to any disclaimer, the term of this patent is extended or adjusted under 35 U.S.C. 154(b) by 797 days.

(21) Appl. No.: 13/146,144

(22) PCT Filed: Jan. 25, 2010

(86) PCT No.: PCT/EP2010/050806
§ 371 (c)(1),
(2), (4) Date: Dec. 21, 2011

(87) PCT Pub. No.: WO2010/086290
PCT Pub. Date: Aug. 5, 2010

(65) Prior Publication Data
US 2012/0138388 A1    Jun. 7, 2012

(30) Foreign Application Priority Data
Jan. 27, 2009    (EP) .................................... 09151446

(51) Int. Cl.
*B66B 1/18* (2006.01)
*B66B 1/24* (2006.01)

(52) U.S. Cl.
CPC ......... *B66B 1/2458* (2013.01); *B66B 2201/103* (2013.01); *B66B 2201/211* (2013.01); *B66B 2201/216* (2013.01); *B66B 2201/231* (2013.01); *B66B 2201/241* (2013.01); *B66B 2201/403* (2013.01); *B66B 2201/405* (2013.01); *Y02B 50/122* (2013.01)

(58) Field of Classification Search
CPC ............ B66B 1/2458; B66B 2201/103; B66B 2201/211; B66B 2201/216; B66B 2201/231; B66B 2201/241; B66B 2201/403; B66B 2201/405; Y02B 50/122
USPC .................. 187/247, 380–389, 391–393, 396
See application file for complete search history.

(56) References Cited

U.S. PATENT DOCUMENTS

| 4,448,286 A | 5/1984 | Kuzunuki et al. |
| 4,536,842 A * | 8/1985 | Yoneda et al. ................. 187/392 |
| 4,838,384 A * | 6/1989 | Thangavelu ................... 187/385 |

(Continued)

FOREIGN PATENT DOCUMENTS

| EP | 1553038 | 7/2005 |
| WO | 2002066356 | 8/2002 |
| WO | 2008142785 | 11/2008 |

OTHER PUBLICATIONS

English translation of International Search Report, PCT/EP2010/050806; mailed Apr. 8, 2010.

(Continued)

*Primary Examiner* — Anthony Salata
(74) *Attorney, Agent, or Firm* — Stroock & Stroock & Lavan LLP (57) ABSTRACT

An elevator system can be operated while recording the energy consumption of at least one energy consumer of the elevator system and at least one traffic situation of the elevator system. At least one energy consumption value is determined for the recorded energy consumption and the recorded traffic situation, and the calculated energy consumption value is output to at least one output means.

20 Claims, 4 Drawing Sheets

(56) References Cited

U.S. PATENT DOCUMENTS

| | | | |
|---|---|---|---|
| 4,958,707 A * | 9/1990 | Yoneda et al. | 187/247 |
| 4,989,694 A * | 2/1991 | Ueshima et al. | 187/380 |
| 4,991,694 A * | 2/1991 | Friedli | 187/387 |
| 5,229,559 A * | 7/1993 | Siikonen et al. | 187/391 |
| 5,252,789 A * | 10/1993 | Sirag et al. | 187/385 |
| 5,307,903 A * | 5/1994 | Morita et al. | 187/382 |
| 5,354,957 A * | 10/1994 | Robertson | 187/247 |
| 5,786,551 A * | 7/1998 | Thangavelu | 187/386 |
| 5,892,190 A * | 4/1999 | Morita et al. | 187/382 |
| 6,315,082 B2 * | 11/2001 | Hikita | 187/382 |
| 6,345,697 B1 * | 2/2002 | Siikonen | 187/382 |
| 6,857,506 B1 | 2/2005 | Tyni et al. | |
| 7,032,715 B2 * | 4/2006 | Smith et al. | 187/380 |
| 7,083,027 B2 * | 8/2006 | Siikonen et al. | 187/383 |
| 7,416,057 B2 * | 8/2008 | Kostka | 187/382 |
| 7,546,907 B2 * | 6/2009 | Finschi | 187/393 |
| 7,610,995 B2 * | 11/2009 | Ylinen et al. | 187/382 |
| 7,694,781 B2 * | 4/2010 | Sorsa et al. | 187/382 |
| 7,743,890 B2 * | 6/2010 | Nikovski et al. | 187/382 |
| 7,866,446 B2 * | 1/2011 | Lindegger | 187/393 |
| 7,909,143 B2 * | 3/2011 | Tyni et al. | 187/382 |
| 8,047,333 B2 * | 11/2011 | Finschi | 187/382 |
| 2004/0178021 A1 | 9/2004 | Finschi | |
| 2005/0263355 A1 * | 12/2005 | Kostka | 187/382 |
| 2010/0126809 A1 * | 5/2010 | Foschini et al. | 187/293 |
| 2011/0308896 A1 * | 12/2011 | Suzuki et al. | 187/384 |
| 2013/0056312 A1 * | 3/2013 | Finschi | 187/382 |

OTHER PUBLICATIONS

English translation of International Preliminary Report on Patentability, PCT/EP2010/050806; issued Aug. 2, 2011.

* cited by examiner

| | |
|---|---|
| 1 | ELEVATOR SYSTEM |
| 2 | ENERGY MEASURING APPARATUS |
| 3 | EVALUATION APPARATUS |
| 4 | DESTINATION CALL CONTROLLER |
| 5 | ELEVATOR CONTROLLER |
| 6 | CALL INPUT APPARATUS |
| 7 | CONTROL CENTER |
| 8 | ELEVATOR DRIVE |
| 9 | DOOR DRIVE |
| 10 | CAR LIGHTING SYSTEM |
| 11 | ELEVATOR DOOR |
| 12 | ELEVATOR DOOR |
| 13 | TOUCHSCREEN |
| 17 | CAR |
| 18 | COUNTERWEIGHT |
| 20 | SENSOR |

21 ENERGY CONSUMPTION VALUE
22 FIELD
23 INPUT BUTTON
24 TRANSMITTING/RECEIVING APPARATUS
25 MOBILE DEVICE
26 BUTTON

ELEVATOR SYSTEM OPERATION UTILIZING ENERGY CONSUMPTION INFORMATION

FIELD

The disclosure relates to operation of an elevator system.

BACKGROUND

EP 1 876 129 A1 describes a method for reducing the energy consumption of an elevator system. In this case, the elevator system is alternatively changed to an operation mode or to a stand-by mode. The highest energy consumption occurs in the operation mode, while the energy consumption in the stand-by mode is lower. Detection means are used to detect a use criterion of the elevator system, such as the presence of a passenger in an elevator car. Stand-by criteria, such as periods of time with a low volume of traffic, are also stipulated. As long as the stand-by criteria have not been met, the elevator system is left in the operation mode. As soon as a stand-by criterion has been met and the use criterion has not been met, the elevator system is changed to the stand-by mode.

U.S. Pat. No. 6,857,506 B1 shows a method for operating an elevator group, an elevator-car-specific energy consumption file being produced in order to describe the energy consumption during a journey of the elevator car for different loads. Floor calls and elevator car calls are allocated to the elevator cars in such a manner that the energy consumption needed to handle all the calls is minimal.

SUMMARY

At least some embodiments of the disclosed technologies specify a method for operating an elevator system, in which energy consumption data are determined and are available for further use.

In some embodiments, an energy consumption of at least one energy consumer of the elevator system and at least one traffic situation of the elevator system are detected. At least one energy consumption value is determined using the detected energy consumption and the detected traffic situation. This determined energy consumption value is output on at least one output means and is thus available for further use. At least one evaluation apparatus determines the energy consumption value, that is to say, it links the energy consumption and traffic situation. This can mean that an energy consumption value is situationally determined and output depending on the traffic. The energy consumption value informs of the energy consumption of an energy consumer, which can make it possible to operate the elevator system in an energy-conscious manner.

U.S. Pat. No. 6,857,596 describes detection of the actual energy consumption for the energy consumption file to be created there. Depending on a respective departure and arrival or destination floor and also depending on a respective load, individual data items for the respective energy consumption are detected on the basis of the respective traffic situation (departure floor, destination floor, load). An energy consumption value which, as an individual number, makes a statement on the efficiency with which the elevator system is operated is not output in this case. If, for example, twelve passengers travel from the first floor, as the departure floor, to the tenth floor, as the destination floor, an energy consumption which takes into account the comparatively large load and the distance is taken as a basis according to U.S. Pat. No. 6,857,596.

The energy consumption value according to the invention takes into account the twelve conveyed passengers as a traffic situation, for example. Since each passenger could also travel alone, the energy consumption value determined is lower when simultaneously transporting a plurality of passengers than when transporting individual passengers and thus expresses that the energy expended is used in a more efficient manner.

If the energy consumption value is indicated to the passengers conveyed in the elevator car, they can immediately discern that, for example, joint use of the elevator system saves energy. When the elevator system is used continuously, users will discern this on account of the indication on the at least one output means and are able to gear their usage behavior of the elevator system thereto. However, an indication of the mere energy consumption (the data item taken as a basis in U.S. Pat. No. 6,857,596) does not make any sense in this scenario since—depending on the respective direction of travel and resultant motor or generator operation and counterweights or the like—the energy consumption for the individual journey with a plurality of passengers is usually higher than for an individual journey with only one passenger which is otherwise the same. An indication of the energy consumption could therefore unfavorably even result in journeys with a high (instantaneous) energy consumption being just avoided, which of course would have to increase the overall energy consumption, however.

In order to detect the energy consumption, provision can be made of at least one energy measuring apparatus, which can be locally placed on the energy consumer. Additionally or alternatively, the respective active power can be detected as the actual energy consumption.

In order to detect the traffic situation, signals from the technical process, namely the elevator system, can be evaluated. A sensor is suitable for obtaining such signals, which sensor communicates, for example, car-specific data, for example a load on an elevator car, to an evaluation apparatus and/or destination call controller and/or elevator controller.

In order to detect the traffic situation, a number of calls per unit of time can be additionally or alternatively detected by a destination call controller and/or elevator controller as signals from the technical process. In order to detect the traffic situation, it can likewise be appropriate for the destination call controller and/or elevator controller to determine a number of passengers who have been conveyed by the elevator system in a unit of time in the building. It can also be appropriate to take a number of passengers who have been conveyed by the elevator system from call input floors to destination floors in a unit of time as a basis as the passenger flow in the building and thus as the traffic situation.

The detected energy consumption and/or the detected traffic situation can be stored in at least one computer-readable data memory, with the result that the stored data can be identified for subsequent use and can be retrieved from the data memory. The evaluation apparatus can then also determine the energy consumption value on the basis of retrieved data. In this case, an energy consumption and/or a traffic situation need only be identified and can then be loaded, which can make renewed detection unnecessary. The same can also apply to the energy consumption value.

In order to detect the energy consumption and/or in order to detect the traffic situation, the evaluation apparatus can simulate the energy consumption or traffic situation, with the result that a future energy consumption value can be determined using the simulated energy consumption and/or the simulated traffic situation even before the elevator system is installed.

In order to detect the traffic situation, signals can be evaluated by different specialized apparatuses, thus resulting in a certain redundancy of the characteristic variables and making it possible to deliberately correct or confirm the detected traffic situation, which in turn can result in correct and confirmed determination of the energy consumption value. For example, in order to detect the traffic situation, signals which are communicated by the destination call controller and/or elevator controller to the evaluation apparatus are first of all processed. Even if the load on the elevator car is detected using a sensor, the signals communicated from there to the evaluation apparatus can be used to correct or confirm the detected traffic situation.

The determined energy consumption value can advantageously be determined for a wide variety of reference variables, for example as an energy consumption value for precisely one energy consumer or as an energy consumption value for precisely one energy consumer and for a particular unit of time. Other suitable reference variables are: the elevator system, the elevator system and a unit of time, the elevator system and a traffic situation, an elevator car, the elevator car and a unit of time. An individual passenger, a passenger and a unit of time or a passenger and a traffic situation can likewise be used as a reference variable, with the result that specified energy consumption values for transporting an individual passenger are available. Some embodiments can take an energy consumption per call, per journey, per journey and unit of time, per journey and traffic situation or an energy consumption per area as a basis. Combinations of all of these reference variables are likewise possible, for example elevator system, unit of time and traffic situation or elevator car, unit of time and passenger and so on. As a result, a plurality of energy consumption values can be provided, to be precise both those which interest a building administrator who manages and operates the building having the elevator system and those which interest the passenger who is moved using the elevator system in the building.

An energy-saving mode of the elevator system can be chosen or selected on the basis of at least one determined energy consumption value or a plurality of determined energy consumption values. The at least one energy consumption value or one of the energy consumption values may result from the fact that no journey has been selected. A plurality of energy consumption values may result, for example, if different traffic situations are taken as a basis. A direct journey and a resultant first energy consumption value, for example, may be taken as a basis for a car or floor call. A second energy consumption value may be determined for a direct journey with a minimum waiting time. A third energy consumption value can be determined for a direct journey and an increased waiting time. Further energy consumption values can be determined for traffic situations if intermediate stops, for instance in order to allow further passengers to get in or out, or detours, in order to allow other passengers to get in or out, are permitted for the journey. Yet further energy consumption values can be determined if it is permitted to enter or leave the elevator car at another floor instead of the starting floor or destination floor. The above examples can be supplemented—as described above and below—with further bases for determination and can be combined with one another. In some cases, it is possible to choose and/or select one value from a plurality of indicated energy consumption values for the purpose of specifying the journey. If only one energy consumption value is indicated, this value can be chosen and/or selected.

In order to assist with choosing or selecting the energy-saving mode, at least one determined energy consumption value can be output on an output means of a control center and/or call input apparatus. From a plurality of determined energy consumption values, it can be possible to output a subset of the determined values, with the result that unfavorable values are not output, for example. Furthermore, a difference in different determined energy consumption values may be provided. An interested person, for example a building administrator in the control center or a passenger on the call input apparatus for example, can choose or select an energy-saving mode of the elevator system on the basis of the energy consumption value which has been output. The term "choose" is understood as meaning a personal choice of an energy consumption value by the interested person. The term "select" is understood as meaning a stipulation of the energy consumption value to be actually used for the journey. In the simplest case, the choice of an energy consumption value is simultaneously also accompanied by a selection of this energy consumption value. In order to further assist with the choice or selection, not only the respective energy consumption value or each respective energy consumption value but also the underlying data, for example the traffic situation, are output, in particular in plain text. Plain text output of the traffic situation can draw a passenger's attention to the fact that, in the event of a floor call, the choice or selection of a first energy consumption value is associated with an increased waiting time and another energy consumption value is associated with an intermediate stop. The respectively interested person can make the choice or selection on this basis in an informed manner.

In addition to the choice on the call input apparatus, at least one energy consumption value can be chosen at another point, for example according to a specification or by the building administrator. Such a choice can be made automatically, for example by taking a predefined or predefinable criterion as a basis. A threshold value which must not be exceeded, for example, can be suitable as such a criterion. An energy consumption value is selected for the journey from a plurality of chosen energy consumption values according to at least one selection rule, in particular in an automatic manner. The selection is advantageously made on the basis of a hierarchical selection rule, with the result that a choice made by a building administrator is given a higher weighting than a choice made by a passenger, for example. Other aspects which can be taken into account with such a selection rule are that a choice made by a VIP passenger is given a higher weighting than a choice made by a non-VIP passenger, that a choice made by a disadvantaged passenger is given a higher weighting than a choice made by a non-disadvantaged passenger (selection fair to disadvantaged persons), that an energy consumption value which is chosen most is selected or is given a higher weighting (democratic selection), that an energy consumption value chosen first is selected or is given a higher weighting (temporal selection), that a chosen energy consumption value is randomly selected (random selection) and so on. A disadvantaged passenger is a physically and/or mentally handicapped person. However, a disadvantaged passenger may also be a passenger with bulky goods, with heavy luggage, with a patient transfer means, with dangerous goods etc. If the applied selection rule is known to the passengers, it is also understood and accepted by the latter.

This can mean that, if different energy consumption values have been chosen for a journey, one of these energy consumption values can be selected according to a defined selection rule or a combination of a plurality of selection rules, for example if a plurality of passengers are conveyed together in the same elevator car. In addition, a building administrator, for example, can stipulate that no low energy consumption values are selected at peak times with a lot of traffic in the building because such a selection is associated with a loss of performance of the elevator system. Conversely, the building administrator can stipulate that only energy consumption values which are as low as possible can be selected outside peak times when there is little traffic in the building, which saves energy. The evaluation apparatus, the destination call controller, the elevator controller, the or each call input apparatus or a control center can be suitable for making the automatic selection according to the or each selection rule.

This can mean that an energy consumption value can be selected in a flexible manner by different parts of the elevator system. If the elevator system has a destination call controller, it can not only allocate calls but can also select the energy consumption value.

In order to operate the elevator system using the selected energy consumption value, the latter can be communicated to at least one destination call controller and/or elevator controller, and at least one part of the elevator system is operated by the destination call controller and/or elevator controller in at least one operating mode linked to the selected energy consumption value. This can mean that both the entire elevator system and individual parts of the latter can be operated with the selected energy consumption value.

The energy consumption value of the elevator system can be determined before the latter is installed. The elevator system can be installed on the basis of the determined energy consumption value. An energy consumption guarantee certificate (certificate) can be issued for an elevator system which has been installed or is to be installed, according to which certificate the actual energy consumption value of the elevator system is guaranteed not to exceed the determined energy consumption value after installation has been concluded. During operation of the elevator system, actual energy consumption values can be continuously or cyclically compared with the energy consumption value according to the certificate. This can mean that an elevator system which deliberately saves energy can planned and advertised and then also installed. Compliance with the energy consumption value can also be checked and/or confirmed by issuing an energy consumption guarantee certificate.

In order to handle at least one call and/or at least one identification code, at least one destination call controller and/or elevator controller can determine(s) at least one journey of at least one elevator car. The or each journey is linked to at least one respective energy consumption value, for example by the evaluation apparatus. One energy consumption value can be selected from the at least one linked energy consumption value on at least one call input apparatus, and a call and/or identification code is/are handled by the destination call controller and/or elevator controller using the journey linked to the selected energy consumption value. This can mean that a plurality of possible journeys or a journey with different energy consumption values is/are determined for a call made by the passenger. The result can therefore be a plurality of energy consumption values, and choosing and/or selecting one of the energy consumption values results in an energy-saving mode.

Further embodiments relate to an elevator system for carrying out the abovementioned method, in which system the energy consumer is at least one elevator drive and/or a door drive and/or an elevator car lighting system, etc. This can mean that the energy consumption of a plurality of very different energy consumers of the elevator system can be detected at the same time or alternately and can therefore be used for an objective decision regarding the energy-conscious operation of the elevator system.

At least one evaluation apparatus can evaluate the detected energy consumption and the detected traffic situation and determines the energy consumption value. The evaluation apparatus may be in the form of an independent apparatus or part of the following apparatuses: an energy measuring apparatus, a destination call controller, an elevator controller, a call input apparatus, a control center and so on. The evaluation apparatus can therefore be placed in a flexible manner.

In some embodiments, the energy measuring apparatus and the evaluation apparatus (also in the form of part of another apparatus) are or can be communicatively connected. A bus system, in particular in the form of a bidirectional bus, is suitable for communicative connection. This can mean that the parts of the elevator system can interchange the information needed to determine the energy consumption value.

At least one output means can be provided for the purpose of outputting the determined energy consumption value. A control center and/or a call input apparatus is/are suitable as the location for fitting the at least one output means. This can mean that the energy consumption value is output at the location of interest, that is to say in a control center in the case of the building administrator or on a call input apparatus in the case of the passenger. An interested person can use the energy consumption value which has been output to decide on the energy-conscious operation of the elevator system by choosing and/or selecting an energy consumption value.

Further embodiments relate to a computer program product, which stores a computer program having program code instructions for implementing the invention and possibly the refinements of the latter. In some embodiments, at least the following units are suitable for executing the computer program, which units have a processing unit in the form of a processor and a memory in a manner known per se for this purpose: energy measuring apparatus, evaluation apparatus, destination call controller, elevator controller, call input apparatus and control center.

BRIEF DESCRIPTION OF THE DRAWINGS

Exemplary embodiments of the disclosed technologies are explained in detail using the figures, in which, in some cases schematically.

DETAILED DESCRIPTION

Figure 1:
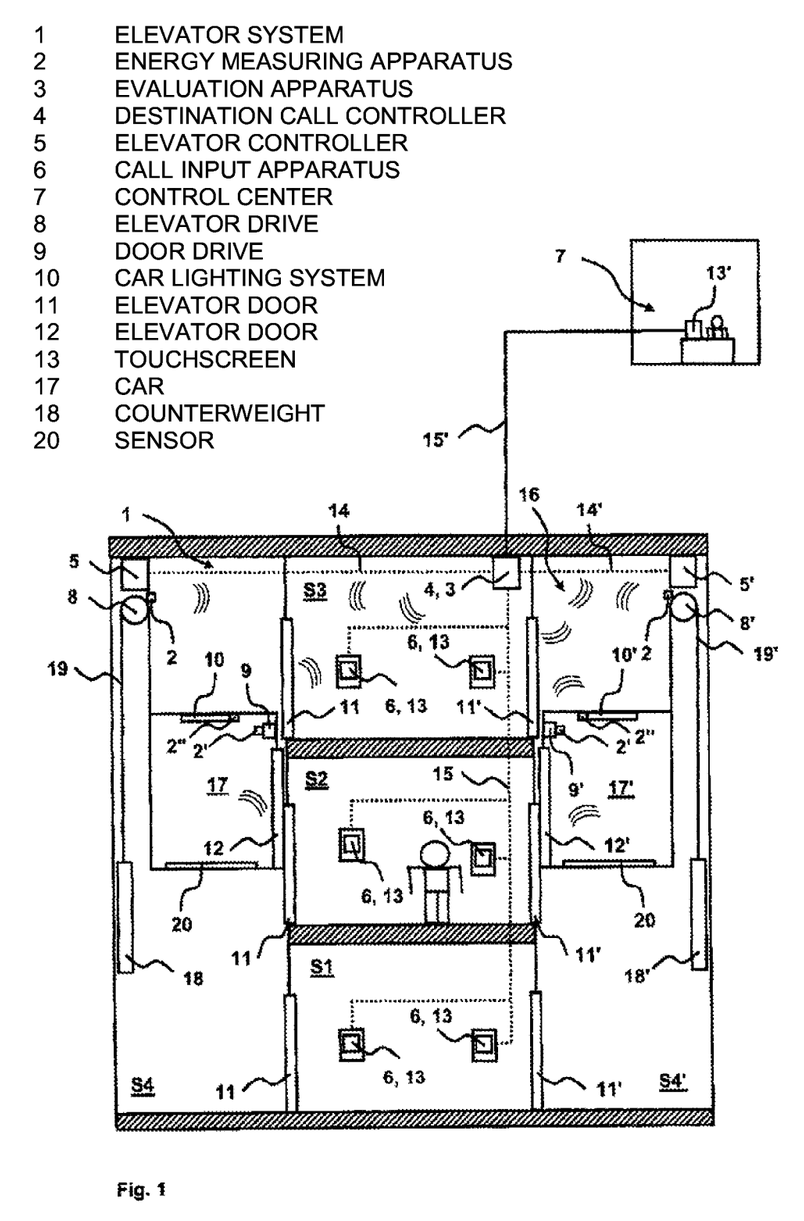
FIG. 1 shows a first exemplary embodiment of part of an elevator system.
Figure 2:
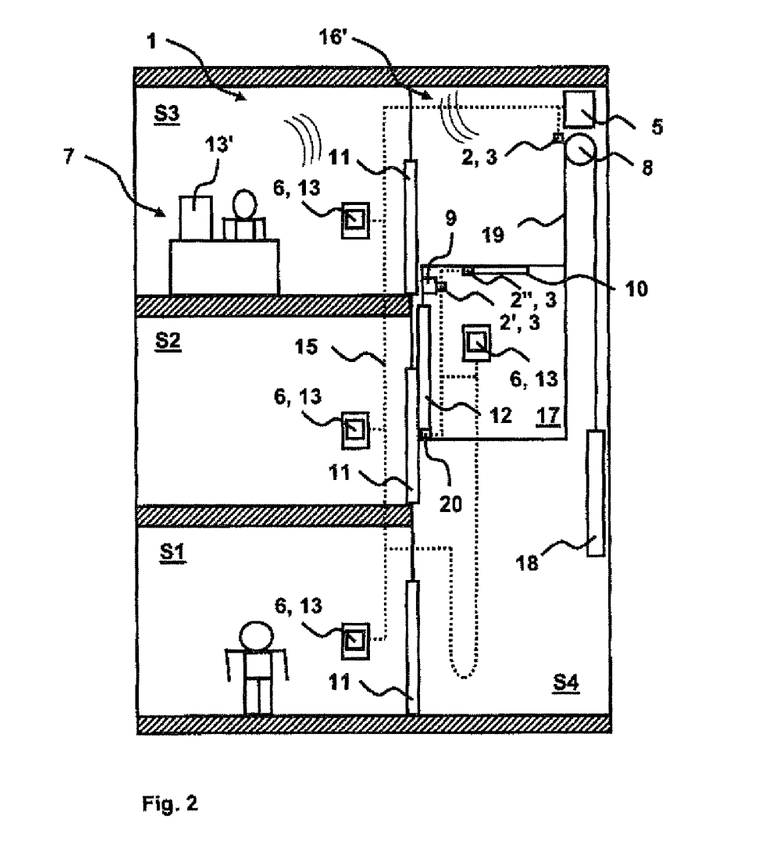
FIG. 2 shows a second exemplary embodiment of part of an elevator system.

FIGS. 1 and 2 show two exemplary embodiments of part of an elevator system 1 in a building. On each floor S1-S3, a passenger can enter and/or leave the elevator car 17, 17' (with elevator car lighting system 10) via at least one elevator door 11, 11', 12, 12'. The elevator car 17, 17' is connected to at least one counterweight 18, 18' via at least one supporting means 19, 19' in at least one elevator shaft S4, S4'.

The current load on the elevator car 17, 17' is detected by at least one sensor 20. In order to detect the traffic situation, the sensor 20 provides sensor data as the signal from the technical process, namely the elevator system 1. A load mat, a light curtain, a motion detector, a camera, a drive torque measuring sensor etc. are suitable as the sensor 20. According to FIG. 1, the sensor 20 is a load mat. According to FIG. 2, the sensor 20 is a motion detector. A load mat detects a weight of a passenger standing on it. In the case of a light curtain which is provided, for example, in the region of the threshold of the elevator car 17, 17' and acts as a sensor 20, said light curtain is (partially) interrupted as soon as a passenger crosses the threshold when entering or leaving the elevator car 17, 17'. The presence (or absence) of a passenger or a plurality of passengers in the elevator car 17, 17' can therefore be detected as the load.

An infrared sensor as the sensor 20 acquires, in a manner known per se, thermal images of the thermal radiation emitted by passengers, with the result that the presence or absence of passengers in the elevator car 17, 17' can be detected as the load. Further embodiments of a sensor 20 are an ultrasonic sensor and a camera, in particular a digital camera. The use of a camera has the advantage of being able to use zoom lenses and/or movable holders, for example in the form of a motor-operated stand. Such an orientation of a camera lens can be changed automatically or in a remotely controlled manner. The camera can be combined with a lighting device in order to ensure the function as a sensor 20 even in unfavorable lighting conditions.

A drive torque measuring sensor as the sensor 20 detects at least one elastic deformation of at least one part of the elevator drive 8, 8', for example a brake lever. This elastic deformation can be converted into sensor data using at least one strain gage and at least one evaluation controller. In learning journeys, elastic deformations of a more or less full elevator car 17, 17' are detected and are stored as reference data with an associated load. The load is thus indirectly detected.

Depending on the type of sensor 20, detected sensor data can be compared with stored reference data. The load associated with those reference data which largely match the detected sensor data is then considered to be the current detected load on the elevator car 17, 17'.

The sensor 20 has at least one processor, at least one computer-readable data memory, at least one adapter for a bus system 15, 15' and/or at least one adapter for at least one radio field 16, 16' as well as an electrical power supply. At least one communication computer program is loaded from the computer-readable data memory and is executed by the processor. The communication computer program controls communication between the sensor 20 and at least one evaluation apparatus 3 and/or destination call controller 4 and/or elevator controller 5, 5'.

Figure 3:
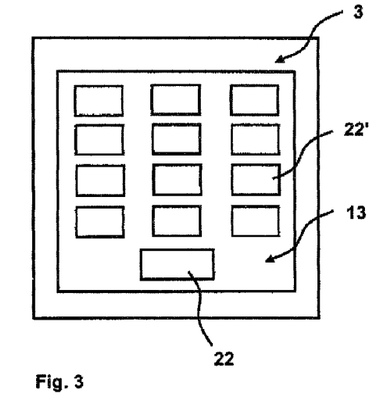
FIG. 3 shows a first exemplary embodiment of part of a call input apparatus of the elevator system according to FIG. 1 or 2.
Figure 4:
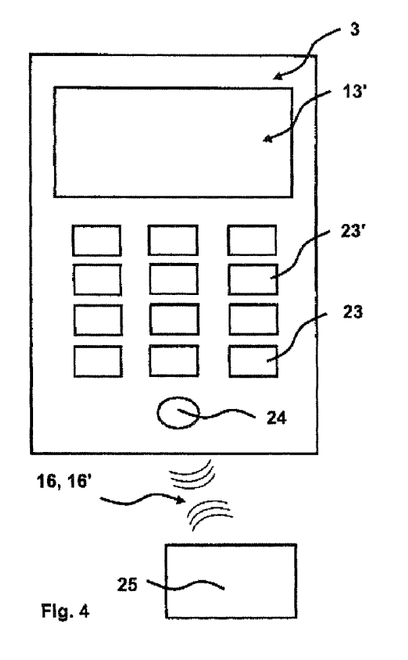
FIG. 4 shows a second exemplary embodiment of part of a call input apparatus of the elevator system according to FIG. 1 or 2.

At least one call input apparatus 6 is arranged close to a floor door 11, 11' and/or in an elevator car 17. The call input apparatus 6 makes it possible for a passenger to input a call. FIG. 3 shows a buttonless call input apparatus 6 in which a call is provided by touching at least one field 22, 22' on the touchscreen 13. FIG. 4 shows a call input apparatus 6 having input buttons 23, 23'. The call can also be input in a contactless manner. In this respect, FIG. 4 shows a call input apparatus 6 having a transmitting/receiving apparatus 24 for receiving identification codes in at least one radio field 16, 16'. Such an identification code is emitted by a mobile device 25 worn by a passenger. The mobile device 25 is, for example, a Radio Frequency Identification Device (RFID) and/or a mobile telephone and/or a mobile computer.

At least one elevator controller 5, 5' has at least one processor and at least one computer-readable data memory. At least one adapter for at least one signal line 14, 14' and/or at least one adapter for at least one bus system 15, 15' and/or at least one adapter for at least one radio field 16, 16' and an electrical power supply are arranged in at least one housing of the elevator controller 5, 5'. According to FIG. 2, the sensor 20 transmits sensor data to the elevator controller 5 in the bus system 15. Furthermore, the call input apparatus 6 according to FIG. 2 transmits a call made by the passenger, in the form of a floor call and/or a car call, to the elevator controller 5 in the bus system 15. A computer program executed by the processor controls the elevator drive 8, 8' and the door drive 9, 9' and reads sensor data from the sensor 20. The computer program determines at least one call allocation for a floor call. The call allocation indicates, in principle, a journey to the call input floor using an elevator car 17 with the shortest possible waiting time. For a floor call, an elevator car 17 is first of all moved to the floor of the call input apparatus 6. A car call to a destination floor is made on a call input apparatus 6 of the elevator car 17 only after the passenger has entered the elevator car 17 and the elevator car 17 is moved to this destination floor.

At least one destination call controller 4 has a configuration which is, in principle, comparable to that of the elevator controller 5, 5' in terms of the processor, data memory, adapter etc. According to FIG. 1, the destination call controller 4 is an independent electronic unit in at least one separate housing, which unit is placed on the floor S3, for example. The destination call controller 4 may also be an electronic plug-in unit, for example in the form of a printed circuit board which is arranged in the housing of a call input apparatus 6, 6' and/or an elevator controller 5, 5'. According to FIG. 1, the sensor 20 transmits sensor data to the destination call controller 4 in the radio field 16. According to FIG. 1, the call input apparatus 6 transmits a call made by the passenger, in the form of a destination call, to the destination call controller 4 in the bus system 15. In the case of a destination call, a desired destination floor is already indicated when inputting the call, with the result that there is no longer any need for a car call. The destination call controller 4 thus already knows the destination floor when the call is input and can therefore optimize not only the approach to the call input floor but also the approach to the destination floor. A computer program executed by the processor in the destination call controller 5 reads the transmitted sensor data and the transmitted destination call. The computer program determines at least one most favorable call allocation for a destination call. The most favorable call allocation indicates, in principle, a journey from a departure floor to an arrival floor using at least one elevator car 17, 17' with the shortest possible waiting time and/or the shortest possible time to the destination. The departure floor need not correspond to the call input floor. In addition, the arrival floor need not correspond to the destination floor desired by the passenger according to the destination call. The computer program can thus bundle passengers from a plurality of call input floors in a departure floor and/or can convey passengers who would like to arrive at different destination floors to an arrival floor. In this case, the passengers then cover the floor difference between the call input floor and departure floor and/or destination floor and arrival floor by stairs and/or an escalator. When allocating the most favorable call allocation to the elevator car 17, 17', at least one start call signal and at least one destination call signal are generated and are transmitted to the adapter of the elevator controller 5, 5' of this elevator car 17, 17' via the signal line 14, 14'.

The destination call controller 4 and the elevator controller 5, 5' communicate in a bidirectional manner via a signal line 14, 14'. According to FIG. 1, the destination call controller 4 is communicatively connected to an elevator controller 5, 5' via a respective signal line 14, 14'. The communication subscribers at the ends of the permanently activated signal lines 14, 14' can be uniquely identified.

The destination call controller 4 and/or the elevator controller 5, 5' detect(s) at least one traffic situation in the building. For this purpose, the destination call controller 4 and/or elevator controller 5, 5' detect(s) at least a number of calls per unit of time. Additionally or alternatively, it is possible to detect the following data: a number of passengers who have been conveyed by the elevator system 1 in a unit of time in the building; a difference in passengers on floors S1-S3 of the building who have been conveyed from call input floors to destination floors by the elevator system 1 in a unit of time; a current number of passengers per floor S1-S3 of the entire building; and so on. The number of passengers per floor S1-S3 is detected using the calls which have been handled and/or from the load on the elevator car 17, 17' when handling the calls. If a plurality of passengers thus make calls on call input apparatuses 6 per unit of time, the passengers on the call input floors and/or departure floors then enter the elevator cars 17, 17' handling the calls and are moved to destination floors and/or arrival floors using the elevator cars 17, 17', the current traffic situation is tracked by virtue of the fact that the number of passengers on the call input floors and/or departure floors decreases by the number of passengers who have been moved and accordingly increases on the destination floors and/or arrival floors.

The load on the elevator car 17, 17', as detected by the sensor 20 when handling the calls, corrects or confirms the number of passengers who have been moved. If, for example, two passengers on the same call input floor make a destination call to the same destination floor in quick succession on a call input apparatus 6, an elevator car 17, 17' is moved to the call input floor for these two passengers. If, however, only one passenger now enters this elevator car 17, 17' and is moved to the destination floor using said car, this information is determined from the load on the elevator car 17, 17' (for example only an actual passenger weight of 80 kg is detected instead of twice the average passenger weight of 75 kg as expected). The destination call controller 4 and/or the elevator controller 5, 5' thus correct(s) and/or supplement(s) the number of calls communicated by the call input apparatus 6 on the basis of the load detected by the sensor 20 of the elevator car 17, 17' during the journey.

The current traffic situation reflects the passenger occupancy of the building in real time. A current traffic situation may also apply to areas of the building, particular floors of the building and individual calls. A current traffic situation may thus also comprise an individual destination call if, for example at an off-peak time, there are only a few passengers in the building and each destination call is individually handled by an elevator car 17, 17'.

At least one energy measuring apparatus 2, 2', 2" detects the energy consumption of at least one energy consumer of the elevator system 1. The energy measuring apparatus 2, 2', 2" is locally placed on the energy consumer and, as an active power meter, detects the actual energy consumption of said consumer. The energy measuring apparatus 2, 2', 2" may have a processor, a computer-readable data memory, an adapter for a bus system 15, 15' and/or an adapter for at least one radio field 16, 16'. At least one communication computer program is loaded from the data memory and is executed using the processor. The communication computer program controls communication between the energy measuring apparatus 2, 2', 2" and at least one evaluation apparatus 3 and/or destination call controller 4 and/or elevator controller 5, 5' and/or call input apparatus 6 and/or control center 7. The energy measuring apparatus 2, 2', 2" is, for example, a measuring apparatus for electrical current, which apparatus is connected between the electrical power supply of the building and the energy consumer. The energy measuring apparatus 2, 2', 2" then detects the electrical current flowing during operation of the respective energy consumer and the electrical voltage and takes into account the phase angle between the current and voltage. According to FIGS. 1 and 2, a first energy measuring apparatus 2 is placed on the elevator drive 8, 8' and detects its energy consumption; a second energy measuring apparatus 2' and a third energy measuring apparatus 2" are placed on the door drive 9, 9' and on the elevator car lighting system 10, respectively, and detect their respective energy consumption. Any known power meter or sensor is suitable as a measuring apparatus, for example a three-phase power meter for a three-phase elevator drive 8, 8', a single-phase power sensor for a DC door drive and so on. Such devices, their functionality and connection requirements are known per se.

At least one evaluation apparatus 3 evaluates at least one detected energy consumption and at least one detected traffic situation. The evaluation apparatus 3 may be an independent apparatus or part of an energy measuring apparatus 2, 2', 2" and/or a destination call controller 4 and/or an elevator controller 5, 5' and/or a call input apparatus 6 and/or a control center 7. The evaluation apparatus 3 may be an electronic plug-in unit, for example in the form of a printed circuit board which, according to FIG. 2, is part of the destination call controller 4 or, according to FIG. 2, is part of one of the energy measuring apparatuses 2, 2', 2". In order to be able to be communicatively connected, the evaluation apparatus 3 comprises at least one adapter for a bus system 15, 15' and/or at least one adapter for a radio field 16, 16'. The evaluation apparatus 3 also comprises a processing unit in the form of a processor and at least one computer-readable data memory. At least one computer program is loaded from the data memory and is executed by the processing unit. The evaluation apparatus 3 links the detected energy consumption to the detected traffic situation. For this purpose, the energy measuring apparatus 2, 2', 2" communicates the detected energy consumption to the evaluation apparatus 3, and the destination call controller 4 and/or the elevator controller 5, 5' communicate(s) the detected traffic situation to the evaluation apparatus 3. The computer program in the evaluation apparatus 3 determines at least one of the following energy consumption values 21 therefrom, for example:

the energy consumption of the elevator system 1 per traffic situation,
 the energy consumption per elevator car 17, 17' and traffic situation,
 the energy consumption per passenger,
 the energy consumption per passenger and unit of time,
 the energy consumption per call,
 the energy consumption per journey,
 the energy consumption per journey and unit of time,
 the energy consumption per journey and traffic situation, and
 the energy consumption per area.

Furthermore, the determination of the following or further energy consumption values can also be suitable, namely for example:

the energy consumption per energy consumer, the energy consumption per energy consumer and unit of time, the energy consumption of the elevator system 1, the energy consumption of the elevator system 1 per unit of time, the energy consumption per elevator car 17, 17', and the energy consumption per elevator car 17, 17' and unit of time.

The unit of time can be selected as desired; typical units of time are minutes, quarter-hours, hours, days, weeks, months, years.

The respective energy consumption value 21 and/or the underlying data can be stored in a computer-readable data memory of the elevator system 1. It is thus possible to detect and store an energy consumption and a traffic situation once in advance. In this case, the energy consumption of an energy consumer need not be detected again, for example; it is then sufficient to identify the stored energy consumption, for example by selecting the or each respective consumer, and to load it from the computer-readable data memory. Only the respectively determined energy consumption value 21 can be stored in exactly the same manner. In this case, it is then sufficient to load an energy consumption value 21 from the computer-readable data memory for an identified energy consumption and an identified traffic situation.

It is also possible to detect and store an energy consumption in advance for standardized elevator systems 1 and/or standardized elevator system components. On account of the standardization, the energy consumption of these energy consumers is identical. In this case, it is sufficient to detect only the traffic situation and to identify a stored energy consumption value 21 for the detected traffic situation and to load said energy consumption value from the computer-readable data memory.

Furthermore, it can be possible to currently detect only the energy consumption of the respective energy consumer for a previously known traffic situation. For example, in some cases the traffic situation in the building is always just below the capacity limit of the elevator system 1 at peak times such as mornings and evenings. For this traffic situation which is always repeated in substantially the same manner in a building, only the energy consumption of the energy consumers needs to be detected and the identified traffic situation can be loaded from the computer-readable data memory in order to determine the energy consumption value 21.

However, it can also be possible to simulate the energy consumption of the energy consumer and/or the traffic situation by means of the evaluation apparatus 3. This can be important, in particular, in the planning phase of an elevator system 1 where the elevator system 1 has not yet been installed but statements on the future energy consumption of the respectively included energy consumers are already needed for the energy-saving design of the elevator system. The evaluation apparatus 3 can then determine the energy consumption of an energy consumer ab initio, for example by simulating a power consumption of an elevator drive 8, 8' and/or a door drive 9, 9' and/or an elevator car lighting system 10, 10', as the energy consumption, and the traffic situation and determining an energy consumption value 21 therefrom. In this case, the evaluation apparatus 3 may be placed with a seller of an elevator system 1 who designs an energy-saving elevator system 1 on the basis of customer wishes. The respective energy consumers or individual energy consumers are then selected in such a manner that they are operated as close as possible to their respective nominal operating point during operation of the elevator system 1. The elevator system 1 is then installed with this energy consumption value 21 determined in advance when planning the elevator system 1. It is also possible to issue an energy consumption guarantee certificate (certificate) for the elevator system 1 as early as when planning the elevator system 1, according to which certificate the energy consumption value 21 of the elevator system 1 does not exceed a guaranteed energy consumption value 21 after installation has been concluded. For example, the certificate for the elevator system 1 states that the energy consumption value 21 corresponds to an energy consumption label "A", "B", "C" etc. according to VDI4707. The certificate can also state that the energy consumption value 21 does not exceed a particular $CO_2$ emission. The accuracy with which the energy consumption value 21 is complied with may be +/−10%, possibly +/−5%.

At least one control center 7 is communicatively connected to the elevator system 1 either via at least one bus system 15', as illustrated in FIG. 1, or via at least one radio field 16', as illustrated in FIG. 2. The control center 7 may be placed outside the building or in the building. FIG. 1 shows an arrangement which is remote from the building and in which the control center 7 is communicatively connected to a destination call controller 4 and to an elevator controller 5, 5' via a bus system 15'. FIG. 2 shows the control center 7 on one of the floors S3 of the building, the control center 7 being communicatively connected to an elevator controller 5 via a radio field 16'. The control center 7 may be operated by a building administrator. The control center 7 may be a computation unit such as a computer, a mobile telephone etc. At least one processor, at least one computer-readable data memory, at least one adapter for a bus system 15, 15' and/or at least one adapter for a radio field 16, 16', at least one output means, for example a screen 13', and an electrical power supply are arranged in at least one housing of the control center 7. A plurality of computer programs which operate independently of one another and/or together can be loaded into the processor of the control center 7. At least one computer program controls the adapter and/or the output means.

The energy measuring apparatus 2, 2', 2", the evaluation apparatus 3, the destination call controller 4, the elevator controller 5, 5', the call input apparatus 6 and the control center 7 can communicate with one another in a bidirectional manner via at least one bus system 15, 15' or via a radio field 16, 16'. Any known bus system is suitable as the bus system 15, 15', for instance a Universal Serial Bus (USB), a Local Operating Network (LON), Modbus, Ethernet and so on. Known local radio networks such as Bluetooth (IEEE 802.15.1), ZigBee (IEEE 802.15.4) or Wi-Fi (IEEE 802.11) or known mobile radio networks such as the Global System for Mobile Communications (GSM), the General Packet Radio Service (GPRS), the Universal Mobile Telecommunications Service (UMTS), etc. can be used for communication in the radio field 16, 16'.

The bus system 15, 15' is illustrated by dotted lines in FIGS. 1 and 2. According to FIG. 1, two call input apparatuses 6 for each floor S1-S3 are respectively communicatively connected to the destination call controller 4 via the bus system 15. Furthermore, according to FIG. 1, the destination call controller 4 is communicatively connected to the control center 7 via a bus system 15'. According to FIG. 2, one call input apparatus 6 for each floor S1-S3 is respectively communicatively connected to an elevator controller 5 via a bus system 15. Furthermore, according to FIG. 2, a plurality of energy measuring apparatuses 2, 2', 2" and the evaluation apparatus 3 are communicatively connected to the elevator controller 5 via the bus system 15. The radio field 16, 16' is illustrated by curved triple circular segments in FIGS. 1 and 2. According to FIG. 1, a plurality of energy measuring apparatuses 2, 2', 2" and the destination call controller 4 and the evaluation apparatus 3 are communicatively connected to one another via a radio field 16. Furthermore, according to FIG. 2, the elevator controller 5 and the control center 7 are communicatively connected to one another via a radio field 16'. In addition to the types of networking mentioned, other wireless or wired types of networking are just as possible as networking topologies or combinations other than those illustrated.

Figure 5:
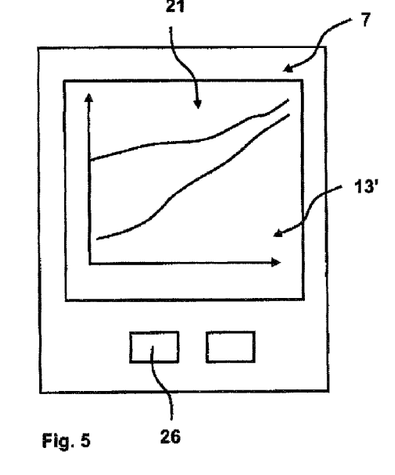
FIG. 5 shows an exemplary embodiment of an energy consumption value of the elevator system according to FIG. 1 or 2, which energy consumption value is output on an output means of a control center.

FIG. 5 shows an exemplary embodiment of an energy consumption value 21 of the elevator system 1, which energy consumption value is output on the output means of the control center 7. For example, according to FIG. 5, a graph containing two different energy consumption values 21 of the elevator system 1 per unit of time is output on the screen 13' of the control center 7, and a building administrator can use at least one button 26 to choose between two operating modes of the elevator system 1 which are linked to the energy consumption values 21 and each result in a different energy consumption. By selecting an energy consumption value 21 of the elevator system 1, the elevator system 1 is operated by the destination call controller 4 and/or elevator controller 5, 5' with the selected energy consumption value 21. The building administrator can thus select between different energy consumption labels. For example, the building administrator decides to operate the elevator system 1 in an energy-saving manner with an energy consumption label "A" or decides to operate the elevator system 1 in a less energy-saving manner with an energy consumption label "B" or "C". During operation of the elevator system 1 with an energy consumption label "A", waiting times and/or times to the destination are greater but an energy consumption and/or a $CO_2$ emission is/are lower than in the case of operation with an energy consumption label "B" or "C". For example, the elevator cars 17, 17' approach only floors with even numbers and/or not all elevator cars 17, 17' move since one or more elevator cars 17, 17' are deliberately switched off for the purpose of saving energy.

The energy consumption value 21 can also be used for billing purposes. For example, a building administrator is issued with a bill for operating the elevator system 1 over a particular unit of time, which bill has been at least partially created on the basis of the energy consumption value 21 of the elevator system 1.

Figure 6:
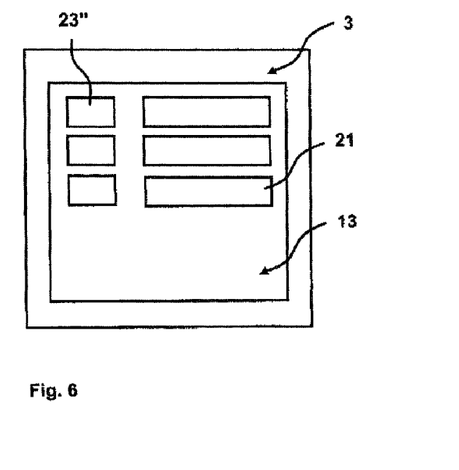
FIG. 6 shows an exemplary embodiment of an energy consumption value of the elevator system according to FIG. 1 or 2, which energy consumption value is output on an output means of the call input apparatus according to FIG. 3.

FIG. 6 shows an exemplary embodiment of an energy consumption value 21 of the elevator system 1, which energy consumption value is output on the output means of a call input apparatus 6.

For example, according to FIG. 6, three different energy consumption values of the elevator system 1 are output on a touchscreen 13 of a call input apparatus 6, for a call which has been input, for a journey for handling the call.

In some cases, a reason for the different energy consumption values may be traffic situations which vary once and on which the determination of the respective energy consumption value was based, for example a direct journey, a direct journey with a waiting time, a journey with permitted intermediate stops and so on. A further or additional reason may be a different energy consumption. For example, an electric motor as the elevator drive 8, 8' is operated in an optimal and energy-optimized manner in the region of its so-called nominal operating point. However, operation outside the nominal operating point is readily possible, for example in the overload range, at least for a limited time. If operation in the region of the nominal operating point means a journey at normal speed, it is possible to increase the speed of the journey during operation in the permissible overload range. Both configurations can result in a respectively different energy consumption of the elevator drive 8, 8' and accordingly in different energy consumption values which can be selected.

The passenger can use at least one field 23" of the touchscreen 13 to choose between the, for example, three journeys linked to the energy consumption values 21, a different energy consumption resulting in each case. By selecting one of the energy consumption values 21, the call is handled by the destination call controller 4 and/or elevator controller 5, 5' using the journey linked to the selected energy consumption value 21. The passenger can thus select between different energy consumption labels. For example, the passenger decides on an energy-saving journey with an energy consumption label "A" or decides on a less energy-saving journey with an energy consumption label "B" or "C".

Figure 7:
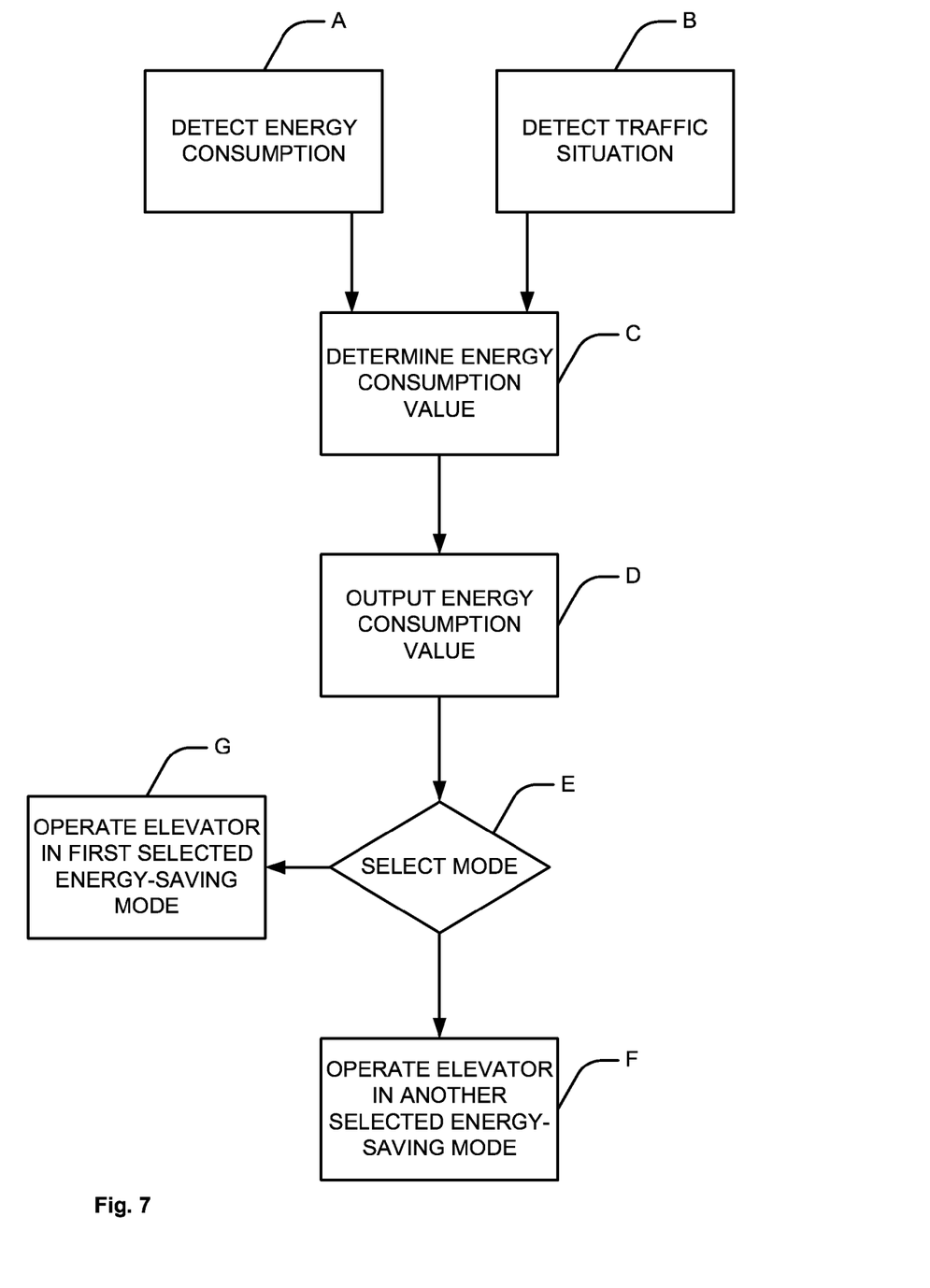
FIG. 7 shows a flowchart having method steps of the method for operating the elevator system according to FIG. 1 or 2 in an energy-saving manner.

FIG. 7 shows a flowchart having method steps of the method for operating the elevator system 1, in particular for energy-saving operation. In a method step A, at least one energy measuring apparatus 2, 2', 2" detects the energy consumption of at least one energy consumer. In a method step B, at least one destination call controller 4 and/or elevator controller 5, 5' detect(s) at least one traffic situation of the elevator system 1. In a method step C, at least one evaluation apparatus 3 determines at least one energy consumption value 21 from a detected energy consumption and a detected traffic situation. In a method step D, the determined energy consumption value 21 is output on at least one output means. In a method step E, at least one energy-saving mode of the elevator system 1 is chosen and/or selected using the determined energy consumption value 21. In a method step F, the elevator system 1 is operated in a first selected energy-saving mode. Alternatively, in a method step F, the elevator system 1 is operated in another selected energy-saving mode using the determined energy consumption value 21.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. We therefore claim as our invention all that comes within the scope and spirit of these claims.

The invention claimed is:

1. An elevator system operation method, comprising:
    determining, based on a detected energy consumption and a detected at least one traffic situation, at least one energy consumption value for each of two or more possible elevator trips for a given elevator destination;
    displaying the two or more possible elevator trips;
    displaying the respective energy consumption values for the two or more possible elevator trips;
    receiving a selection of one of the respective energy consumption values or a selection of one of the two or more possible elevator trips; and
    operating at least one elevator car of an elevator system based on the selection of the one of the respective energy consumption values or the selection of the one of the two or more possible elevator trips.

2. The elevator system operation method of claim 1, further comprising:
    determining the two or more possible elevator trips; and
    determining the respective energy consumption values for the two or more possible elevator trips.

3. The elevator system operation method of claim 1, the two or more possible elevator trips and the respective energy consumption values being displayed on a destination call input device.

4. An elevator system operation method, comprising:
 detecting an energy consumption of at least one energy consumer of an elevator system;
 detecting at least one traffic situation of the elevator system;
 determining, based on the detected energy consumption and the detected at least one traffic situation, at least one energy consumption value;
 outputting the determined at least one energy consumption value for use by an elevator passenger or a system call center in determining an elevator trip to select;
 receiving a selection made in response to outputting the determined at least one energy consumption value; and
 operating at least one elevator car of an elevator system based on the received selection.

5. The elevator system operation method of claim 4, the detecting the at least one traffic situation comprising:
 detecting, using at least one destination call controller or at least one elevator controller, a number of calls per unit of time; and
 determining, using the at least one destination call controller or the at least one elevator controller, the at least one traffic situation based on the number of calls per unit of time.

6. The elevator system operation method of claim 4, the detecting the at least one traffic situation comprising:
 detecting, using at least one destination call controller or at least one elevator controller, a number of passengers who have been conveyed by the elevator system in a unit of time; and
 determining, using the at least one destination call controller or the at least one elevator controller, the at least one traffic situation based on the number of passengers who have been conveyed by the elevator system in the unit of time.

7. The elevator system operation method of claim 4, the detecting the at least one traffic situation comprising:
 detecting, using at least one destination call controller or at least one elevator controller, a difference in passengers on floors of the building who have been conveyed by the elevator system from call input floors to destination floors in a unit of time; and
 determining, using the at least one destination call controller or the at least one elevator controller, the at least one traffic situation based on the difference in passengers.

8. The elevator system operation method of claim 4, the at least one energy consumption value being determined by at least one evaluation apparatus.

9. The elevator system operation method of claim 8, the at least one evaluation apparatus comprising a destination call controller.

10. The elevator system operation method of claim 4, further comprising simulating the energy consumption of the at least one energy consumer.

11. The elevator system operation method of claim 4, further comprising:
 detecting at least one load of at least one elevator car; and
 correcting the determined traffic situation based on the detected at least one load.

12. The elevator system operation method of claim 4, further comprising:
 determining a target energy consumption value for the elevator system before installation of the elevator system; and
 installing the elevator system to conform to at the target energy consumption value.

13. The elevator system operation method of claim 4, the at least one energy consumption value comprising a plurality of energy consumption values, the method further comprising:
 receiving a selection of one of the plurality of energy consumption values; and
 operating the elevator system according to the selected one of the plurality of energy consumption values.

14. The elevator system operation method of claim 13, further comprising:
 receiving, through at least one call input apparatus, at least one call input or at least one identification code;
 determining at least one journey of at least one elevator car according to the at least one call input or the at least one identification code;
 associating the at least one journey with a respective one of the plurality of energy consumption values; and
 displaying the at least one journey and the respective one of the plurality of energy consumption values.

15. An elevator installation comprising:
 at least one elevator car disposed in an elevator shaft;
 at least one energy measurement device coupled to the at least one elevator car; and
 at least one processor, the processor being coupled to the at least one energy measurement device and being configured to,
  receive energy consumption information from the at least one energy measurement device,
  determine at least one traffic situation of the elevator installation,
  determine, based on the energy consumption information and the at least one traffic situation, at least one energy consumption value, and
  output the determined at least one energy consumption value for use by an elevator passenger or a system call center in determining an elevator trip to select;
  receive a selection made in response to outputting the determined at least one energy consumption value; and
  operate at least one elevator car of an elevator system based on the received selection.

16. The elevator installation of claim 15, wherein the processor is part of the energy measurement device.

17. The elevator installation of claim 15, wherein the processor is part of a destination call controller.

18. The elevator installation of claim 15, wherein the processor is part of a call input apparatus.

19. One or more computer-readable data memories having encoded thereon instructions that, when executed by a processor, cause the processor to:
 detect an energy consumption of at least one energy consumer of an elevator system;
 detect at least one traffic situation of the elevator system;
 determine, based on the detected energy consumption and the detected at least one traffic situation, at least one energy consumption value; and
 output the determined at least one energy consumption value for use by an elevator passenger or a system call center in determining an elevator trip to select;
 receive a selection made in response to outputting the determined at least one energy consumption value; and
 operate at least one elevator car of an elevator system based on the received selection.

20. One or more computer-readable data memories having encoded thereon instructions that, when executed by a processor, cause the processor to:
- determine, based on a detected energy consumption and a detected at least one traffic situation, at least one energy consumption value for each of two or more possible elevator trips for a given elevator destination;
- display the two or more possible elevator trips;
- display the respective energy consumption values for the two or more possible elevator trips;
- receive a selection of one of the respective energy consumption values or a selection of one of the two or more possible elevator trips; and
- operate at least one elevator car of an elevator system based on the selection of the one of the respective energy consumption values or the selection of the one of the two or more possible elevator trips.

* * * * *